8985X
J. Scott,
Fire-Proof Safe.
Patented July 21, 1835.
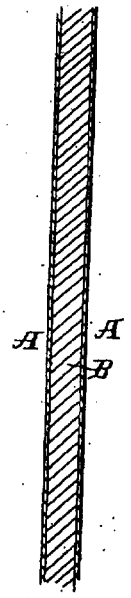

John Scott

The schedule referred to in these Letters Patent and
making part of the same containing a description in the
words of the said John Scott himself of his improvement
in the use and application of Asbestos to protect fire
proof chests. boxes and Closets from the action and
influence of fire and excessive heat.

To all to whom these Presents shall come
Be it known that I John Scott of the City of Philadel-
phia in the County of Philadelphia and State of Penn-
sylvania have invented a new and usefull improvement
in the use and application of Asbestos to protect fire
proof chests boxes and closets from the action and influ-
ence of fire and excessive heat and the following is a full
and exact description of the construction and operation
of the said improvement. Asbestos has been heretofore
used to guard against the action of fire, The more
flexible qualities of it have been employed in the
manufacture of incombustible cloth. My improvement
consists in the application and use of the same materi-
al in combination with substances and articles which
have heretofore been exposed to the influence of fire without
it but will now derive greatly increased security &
protection from its use. These articles are fire proof
chests boxes, closets, doors and their different parts,
The asbestos formed into sheathing, or in any other con-
venient form is used to cover the material of which
the above mentioned or other similar articles are com-
posed, and thus employed it gives additional protection
to their contents by preventing the warping or cracking
to which they are of themselves more or less liable when expo-
sed to the influence of excessive heat. This use of Asbestos I [illegible]
claim as an improvement of my own. John Scott [illegible]
Witnesses William Meloney Stephen D. [illegible]